United States Patent [19]

Wilczek et al.

[11] Patent Number: 6,100,350

[45] Date of Patent: *Aug. 8, 2000

[54] BRANCHED POLYMER SYNTHESIS

[75] Inventors: Lech Wilczek, Wilmington; Elizabeth Forrester McCord, Hockessin, both of Del.

[73] Assignees: E. I. du Pont de Nemours and Company, Wilmington, Del.; Commonwealth Scientific and Industrial Research Organization, Victoria, Australia

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/125,466

[22] PCT Filed: Feb. 18, 1997

[86] PCT No.: PCT/US97/02913

§ 371 Date: Aug. 19, 1998

§ 102(e) Date: Aug. 19, 1998

[87] PCT Pub. No.: WO97/31031

PCT Pub. Date: Aug. 28, 1997

Related U.S. Application Data

[60] Provisional application No. 60/012,131, Feb. 23, 1996.

[51] Int. Cl.[7] ........................................... C08F 2/42
[52] U.S. Cl. ..................... 526/82; 526/303.1; 526/316; 526/317.1; 526/319; 526/332; 526/341
[58] Field of Search ..................... 526/316, 317.1, 526/319, 332, 82, 303.1, 341

[56] References Cited

U.S. PATENT DOCUMENTS

| | | | |
|---|---|---|---|
| 4,680,352 | 7/1987 | Janowicz et al. | 526/147 |
| 5,362,813 | 11/1994 | Antonelli et al. | 525/286 |
| 5,362,826 | 11/1994 | Berge et al. | 526/194 |
| 5,773,534 | 6/1998 | Antonelli et al. | 526/82 |

FOREIGN PATENT DOCUMENTS 73-034882 of 0000 Japan .

OTHER PUBLICATIONS

Salamone, Polymeric Materials Encyclopedia, 3, 1799–1830, 1996.

Salamone, Polymeric Materials Encyclopedia, 5, 3049–3185, 1996.

*Primary Examiner*—David W. Wu
*Assistant Examiner*—Caixia Lu
*Attorney, Agent, or Firm*—James A. Costello; Sudhir G. Deshmukh

[57] ABSTRACT

This invention relates to a process for the synthesis of addition polymers containing branches upon branches and having a polymerizable olefin end group by a convenient one-pot copolymerization of selected vinyl monomers with chain polymerization initiators and a method to provide olefin end groups by chain transfer or termination agents; and polymers produced thereby.

8 Claims, No Drawings

BRANCHED POLYMER SYNTHESIS

This application is a §371 national phase application of PCT/US97/02913 filed on Feb. 18, 1997, which takes priority from U.S. provisional application Ser. No. 60/012,131 filed on Feb. 23, 1996.

Precise macromolecular engineering using commodity monomers is becoming a major trend in polymer technology to satisfy the demand for new properties, improved cost effectiveness, ecology and quality. Functional polymers with low molecular weight, low polydispersity, compact, branched structures and terminally located reactive groups are expected to exhibit superior performance/cost characteristics, by virtue of lower inherent viscosity and higher reactivity vs. conventional linear statistical copolymers.

The terminally functional branched polymers appear to be ultimate reactive substrates for networks, because the branch points can substitute for a significant portion of expensive reactive groups and provide a better control of the reactive groups distribution. Particularly polymers having large numbers of short branches below critical molecular weight are unlikely to form any entanglements and should exhibit low inherent viscosity and good flow even in concentrated solutions.

Conventional techniques for sythesizing well defined branched polymers require expensive multistep processes involving isolation of reactive intermediate macromonomers. The macromonomers have polymerizable end groups, which are usually introduced using functional initiator, terminating or chain transfer agent. Well defined branched polymers are prepared by the macromonomer homopolymerization or copolymerization with suitable low molecular weight comonomer selected based on known reactivity ratios.

U.S. Pat. No. 4,680,352 describes molecular weight reduction and macromonomer (polymers or copolymers with unsaturated end-groups) synthesis in copolymerizations with acrylates and styrene with various Co(II) complexes.

J. Antonelli, et. al., U.S. Pat. No. 5,362,813 and C. Berge, et al., U.S. Pat. No. 5,362,826 disclose the preparation of macromonomers by radical addition-fragmentation processes and the copolymerization of macromonomers. Branched structures were not well characterized and the reincorporation of the branched macromonomers into more complex structures was not considered.

Dendrimers or hyperbranched polymers prepared using expensive, special multifunctional monomers or expensive multistep methods requiring repetitive isolation of the reactive intermediates have been reviewed by J. C. Salamone, ed., Polymeric Materials Encyclopedia, Vol.5 (1996).

The references cited above cover the copolymerization of vinyl monomers in the presence of chain transfer reagents, but do not disclose synthetic conditions for production of macromonomers or polymers containing branches upon branches.

SUMMARY OF THE INVENTION

This invention relates to a general process for the synthesis of addition polymers containing branches upon branches and having a polymerizable olefin end group by a convenient one-pot polymerization of selected vinyl monomers with chain polymerization initiators and a method to provide olefin end groups by chain transfer or termination agents. The polymerization is carried out in such a manner that chain transfer occurs frequently and each chain transfer event terminates that particular polymer chain with terminal polymerizable olefinic functionality. Subsequent reincorporation of the polymer chains produced early in the reaction leads to branching of subsequently-formed polymer chains which are terminated with polymerizable olefinic functionality. Subsequent reincorporation of the branched polymer chains leads to subsequently-formed polymer chains containing branches-upon-branches which are terminated with polymerizable olefinic functionality. Spontaneous repetition of the process leads to highly branched or hyperbranched products still retaining termini with polymerizable olefinic functionality.

This invention concerns an improved process for the free-radical polymerization of at least one unsaturated vinylic monomer to form a polymer whose molecular architecture includes branches upon branches and a polymerizable vinyl-terminated end group, comprising contacting, in the presence of a free-radical initiator:

(i) one or more vinylic monomers having the formula $CH_2=CYZ$, and
(ii) a chain transfer agent of formula $CH_2=CQ(CH_2-X)$, wherein:

Y is selected from the group consisting of OR, $O_2CR$, halogen, $CO_2H$, COR, $CO_2R$, CN, $CONH_2$, CONHR, $CONR_2$ and R';

Z is selected H, $CH_3$, or $CH_2OH$;

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen, and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;

X is selected from $—(CUY—CH_2)_n—Z'$, S(O)R, $S(O)_2R$, $SnR_3$, halogen, $R^2$ and $R^3$;

U is selected from H and R;

Q is selected from Y, or in the case where X is halogen, Y and H;

Z' is selected from H, $SR^1$, S(O)R, $S(O)_2R$, $R^2$ and $R^3$;

n is $\geq 1$;

R is selected from the group substituted and unsubstituted alkyl, aryl, aralkyl, alkaryl and organosilicon groups wherein the substituent(s) are independently from the group carboxyl, epoxy, hydroxyl, alkoxy, amino and halogen;

$R^1$ is selected from the group H, substituted and unsubstituted alkyl, aryl, aralkyl, alkaryl and organosilicon groups wherein the substituent(s) are independently from the group carboxyl, epoxy, hydroxyl alkoxy, amino and halogen;

$R^2$ is selected from the group free radical initiator-derived fragments of substituted and unsubstituted alkyl, cycloalkyl, aryl, aralkyl, alkaryl, organosilyl, alkoxyalkyl, alkoxyaryl, sulfate groups wherein the substituent(s) are independently selected from R, $OR^1$, $O_2CR$, halogen, $CO_2H$ and salts thereof, $CO_2R$, CN, $CONH_2$, $CO_2NHR$, $CONR_2$;

$R^3$ is selected from the group free radical initiator-derived fragments of substituted and unsubstituted alkyl, cycloalkyl, aryl, aralkyl, alkaryl, organosilyl, alkoxyalkyl, alkoxyaryl, and $P(O)R_2$ groups wherein the substituent(s) are independently selected from R, $OR^1$, $O_2CR$, halogen, $CO_2H$ and salts thereof, $CO_2R$, CN, $CONH_2$, $CO_2NHR$, $CONR_2$;

wherein the improvement comprises obtaining higher yields of polymer having the branch-upon-branch architecture and polymerizable vinylic chain termini, and a higher density of branches upon branches in that polymer by optimizing the polymerization in the following way: select step III and at least one of I; II; I and IV; and II and IV from steps:

I—decreasing reactivity ratios of (i) and the resulting vinylic-terminated macromonomers and polymers toward 0;

II—selecting the ratio of (i)/(ii) between 2 and 100, dependent on the values of I, III and IV;

III—increasing the conversion of (i) and (ii) from 80% toward 100%;

IV—increasing the temperature from 50° toward 150° C.

Based on the disclosure and Examples presented herein, one skilled in the art will be readily able to select the optimum ratio of (i)/(ii) for any given class of monomer(s) and values of (I), (III) and (IV) with minimum experimentation. One skilled in the art will also be able to select the appropriate chain transfer agent for the monomer(s) being polymerized, by reference to the well-known reactivity ratios of said chain transfer agents and monomer(s).

This invention further concerns the product of the above reaction which is composed primarily of a polymer having a branch-upon-branch structure and a polymerizable olefinic end group, having the structure:

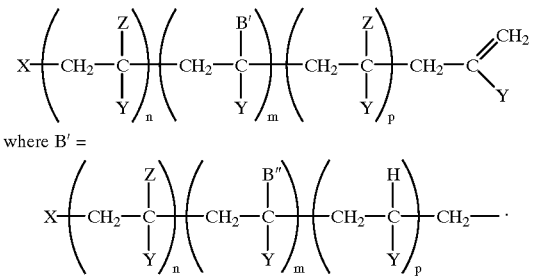

where B' =

$B''$=X, B', H, $CH_3$, $CH_2CHR^1CH_3$, or $CH_2CMeR^2CH_3$, n=1–20, m=0–5, p=0–20; n+m+p≧2;

and if m>1, then the m insertions are not consecutive. X, Y, Z, $R^1$ and $R^2$ are as earlier defined.

DETAILED DESCRIPTION

We have discovered a general process for the synthesis of addition polymers containing branches upon branches and having a polymerizable vinylic end group by a convenient one-pot polymerization of selected vinyl monomers with chain polymerization initiators and a method to provide olefin end groups by chain transfer or termination agents. The polymerization is carried out in such a manner that chain transfer occurs frequently and that each chain transfer event terminates that particular polymer chain terminated with polymerizable olefinic functionality. The process is shown in Scheme 1.

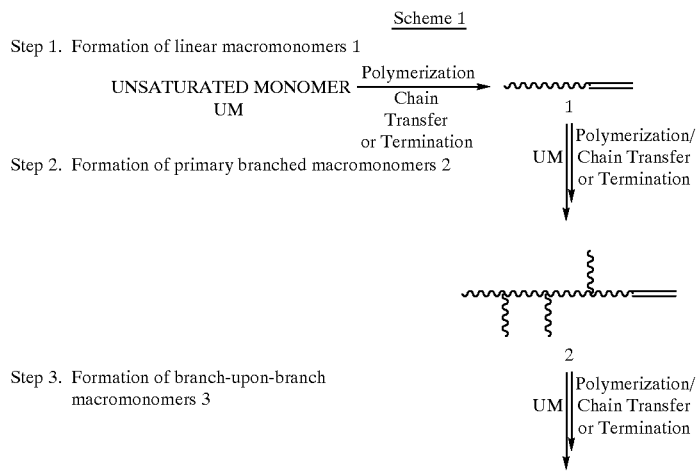

Scheme 1

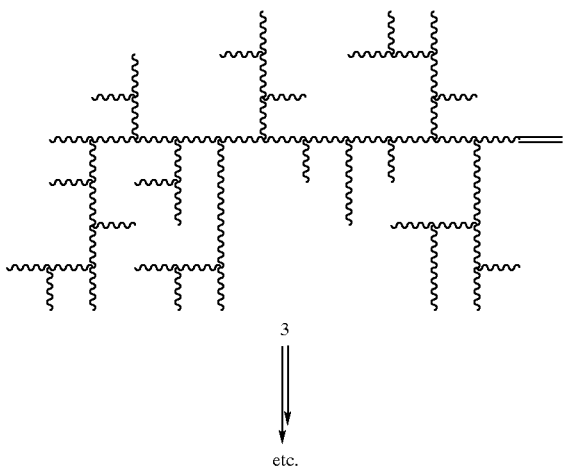

etc.

Subsequent reincorporation of the polymer chains produced early in the reaction leads to branching of subsequently-formed polymer chains which are terminated with polymerizable olefinic functionality. Subsequent reincorporation of the branched polymer chains leads to subsequently-formed polymer chains containing branches-upon-branches which are terminated with polymerizable olefinic functionality. Spontaneous repetition of the process leads to highly branched or hyperbranched products still retaining termini with polymerizable olefinic functionality.

The polymers made by the present process are useful in a wide variety of coatings. Other potential uses can include cast, blown, spun or sprayed applications in fiber, film, sheet, composite materials, multilayer coatings, photopolymerizable materials, photoresists, surface active agents, dispersants. adhesives, adhesion promoters, coupling agents, commpatibilizers and others. End products taking advantage of available characteristics can include, for example, automotive and architectural coatings or finishes, including high solids, aqueous or solvent based finishes. Polymers, such as those produced in this invention, would find use in, for example, structured polymers for use in pigment dispersants.

In a preferred process the free-radical initiator is selected from azo initiators, typical examples of which include: 2,2'-azobis(isobutyronitrile), VAZO-88=1,1'-azobis (cyclohexane-1-carbonitrile) (DuPont Co., Wilmington, Del.) VR-110=2,2'-azobis(2,4,4-trimethylpentane) (Wako Pure Chemical Industries, Ltd., Osaka, Japan) Chain transfer reagents, $CH_2=CQ(CH_2-X)$, can be based upon vinylidene macromonomers prepared by several methods. A good example is the methyl methacrylate trimer, $CH_2=C(CO2Me)-CH_2-CMe(CO2Me)-CH_2-CMe(CO2Me)-CH_3$. These radical addition-fragmentation chain transfer agents have been reviewed by E. Rizzardo, etal., Macromol. Symp. 98, 101 (1995).

Other organic chain transfer reagents include allylic sulfides, sulfones, bromides, phosphonates, stannanes, vinylidene terminated methacrylic oligomers, a-methyl styrene dimer and related compounds. Preferred chain transfer agents and polymerizable intermediate macromonomers exhibit dual reactivity, in that they can both undergo copolymerization or homopolymerization as well as promote competitive chain transfer through the addition-elimination process.

Substituent Q of the chain transfer reagent is chosen to convey the appropriate reactivity of the olefinic group in radical polymerization of the desired monomer(s) under polymerization conditions. The substituents Q and X can also be chosen so as to introduce any required end-group functionality into the polymer. Therefore using functional chain transfer agent (iii) can be a prefered method. These end groups can be the same or different and can be chosen such that the final polymer can be telechelic. Suitable end groups are particularly those compatible with free radical polymerization and include epoxy, hydroxyl, carboxyl, silyl.

The process can be potentially conducted by bulk, solution, suspension or emulsion polymerization using batch or preferably starved feed reactor, which offers better process control.

The treelike branched polymers are formed by in situ generation and copolymerization of first linear and subsequently increasingly branched macromonomers through the polymerizable olefin group. The method was demonstrated by model kinetic studies of monomer, chain transfer agent (CTA) conversions, polymer molecular weight increase combined with quantitative end group and branching characterization when reacting vinylidene MMA-trimer used as a CTA and butyl acrylate (BA) in a starved-feed reactor. Macromolecules typically with 2 to 30 branches each containing 5 to 20 monomers were prepared, branch length being primarily controlled by the monomer/chain transfer agent ratio, conversion and to some extend by temperature.

A chain polymerization is controlled by a chain transfer step so as to provide a polymerizable olefin end group (Scheme 1). The branch-upon-branch structure is built by in situ generation and copolymerization of linear and subsequently increasingly branched macromonomers through the polymerizable olefin group.

That monomer copolymerizability is primarily determined by the steric and electronic properties is well documented in the art. The chain process can involve either one or several different comonomers. Typical monomers include acrylates, methacrylates, acrylonitrile, methacrylonitrile, acrylamide, methacrylamide, styrene, a-methylstyrene, halogenated olefins, vinyl esters, but also can include N-vinyl carbazole, N-vinyl pyrrolidone, and dienes such as isoprene, and chloroprene.

Quantitative NMR analysis of the products, particularly end group structure and branching, combined with oligomer analysis by MALDI mass spectroscopy show that conventional radical termination and chain transfer processes can be effectively suppressed under these conditions, when acrylates (or styrene) are copolymerized with the vinylidene macromonomer/chain transfer agent. The polymer molecular weight and end group structure are predominantly controlled by the β-scission chain transfer. High conversions (usually 80–90%) of the vinylidene end group are predominantly achieved by the incorporation, i.e., copolymerization leading to branches. The data are consistent with a mechanism, in which the initially formed branched macromolecules receive predominantly the vinylidene end group through the β-scission chain transfer. Having a reactive vinylidene end group allows the singly-branched macromolecules to participate in analogous subsequent (secondary) copolymerization steps leading eventually to even more branched structures, which could be called branch-upon-branch polymers.

Formation of branch-upon-branch structures is indicated by the significant increase in the polymer molecular weight and in the number of branches per polymer molecule that occurs even at nearly complete conversion of the vinylidene $(MMA)_3=$, which was used as a chain transfer agent and model macromonomer and at high acrylate monomer conversions. The development of characterization methods for branched polymer formation from vinylidene macromonomers by NMR, SEC, GC, MALDI mass spectroscopy was essential for developing and confirmation of this method of making branch-upon-branch structures, see E. McCord, et al., ACS Polymer Prep. 36 (2), 106 (1995).

Branching density estimated from the ratio of grafting to β-scission is primarily determined by the BA/chain transfer agent ratio, conversion and to some extend by temperature in the range 60 to 100° C. Under standard conditions, one MMA-trimer branch occurs per 8 to 16 BA comonomers consumed, which corresponds to 1000–2,000 molecular weight of BA segment per one branch and is desirably below an entanglement length.

The copolymers were characterized by $^1H$ and $^{13}C$ NMR, by conventional SEC using RI detector vs. PMMA standards and compared with data obtained using universal calibration in THF and the light-scattering weight-average molecular weights. Under typical radical copolymerization conditions in starved feed reactor used in these studies, about a 10-fold molar excess of acrylate comonomer over methacrylate vinylidene macromonomer is required to achieve acceptable yield (>10%) and a significant number (>5) of branches per macromolecule. The number of 5 branches per molecule is a minimum (per definition) for branch-upon-branch structures.

Kinetic data at early and intermediate conversions showed as expected that β-scission is favored over incorporation by higher temperatures. At almost complete vinylidene group conversion, the effect of temperature on the overall ratio of incorporation to β-scission was found to be small. This is evidently due to somewhat higher activation energy of the competing β-scission vs. the incorporation and due to the fact that incorporation is a major mechanism of the vinylidene group consumption.

Preferred monomers are:
methyl acrylate,
ethyl acrylate,
propyl acrylate (all isomers),
butyl acrylate (all isomers),
2-ethylhexyl acrylate,
isobornyl acrylate,
acrylic acid,
benzyl acrylate,
phenyl acrylate,
acrylonitrile,
glycidyl acrylate,
2-hydroxyethyl acrylate,
hydroxypropyl acrylate (all isomers),
hydroxybutyl acrylate (all isomers),
diethylaminoethyl acrylate,
triethyleneglycol acrylate,
N-tert-butyl acrylamide,
N-n-butyl acrylamide,
N-methyl-ol acrylamide,
N-ethyl-ol acrylamide,
trimethoxysilylpropyl acrylate,
triethoxysilylpropyl acrylate,
tributoxysilylpropyi acrylate,
dimethoxymethylsilylpropyl acrylate,
diethoxymethylsilylpropyl acrylate,
dibutoxymethylsilylpropyl acrylate,
diisopropoxymethylsilylpropyl acrylate,
dimethoxysilylpropyl acrylate,
diethoxysilylpropyl acrylate,
dibutoxysilylpropyl acrylate,
diisopropoxysilylpropyl acrylate,
vinyl acetate,
vinyl propionate,
vinyl butyrate,
vinyl benzoate,
vinyl chloride,
vinyl fluoride,
vinyl bromide,
methyl methacrylate,
ethyl methacrylate,
propyl methacrylate (all isomers),
butyl methacrylate (all isomers),
2-ethylhexyl methacrylate,
isobornyl methacrylate,
methacrylic acid,
benzyl methacrylate,
phenyl methacrylate,
methacrylonitrile,
alpha methyl styrene,
trimethoxysilylpropyl methacrylate,
triethoxysilylpropyl methacrylate,
tributoxysilylpropyl methacrylate,
dimethoxymethylsilylpropyl methacrylate,
diethoxymethyl-silylpropylmethacrylate,
dibutoxymethylsilylpropyl methacrylate,
diisopropoxymethylsilylpropyl methacrylate,
dimethoxysilylpropyl methacrylate,
diethoxysilylpropyl methacrylate,
dibutoxysilylpropyl methacrylate,
diisopropoxysilylpropyl methacrylate,
isopropenyl butyrate,
isopropenyl acetate,
isopropenyl benzoate,
isopropenyl chloride,
isopropenyl fluoride,
isopropenyl bromide
itaconic acid
itaconic anhydride
dimethyl itconate.
methyl itaconate
N-tert-butyl methacrylamide,
N-n-butyl methacrylamide,
N-methyl-ol methacrylamide,
N-ethyl-ol methacrylamide,
isopropenylbenzoic acid (all isomers),
diethylamino alphamethylstyrene (all isomers),
para-methyl-alpha-methylstyrene (all isomers),
diisopropenylbenzene (all isomers),
isopropenylbenzene sulfonic acid (all isomers),
methyl 2-hydroxymethylacrylate,
ethyl 2-hydroxymethylacrylate,
propyl 2-hydroxymethylacrylate (all isomers),
butyl 2-hydroxymethylacrylate (all isomers),
2-ethylhexyl 2-hydroxymethylacrylate
isobornyl 2-hydroxymethylacrylate.

styrene,
vinyl benzoic acid (all isomers),
diethylamino styrene (all isomers),
para-methylstyrene (all isomers),
divinylbenzene (all isomers), and
vinyl benzene sulfonic acid (all isomers).

EXAMPLES

Examples 1–15

Preparation of Branch-Upon-Branch Poly(butyl acrylates) Using Methyl Methacrylate Vinylidene Trimer (MMA)$_3$= as Chain Transfer Agent and Macromonomer This procedure illustrates the preparation, analysis and proof of the branch-upon-branch polymer architecture in which there are at least 5 branches in a starved feed reactor by a multi step/one pot process. Conditions of the branch-upon-branch structure formation are identified from the effects of temperature, monomer, chain transfer agent and initiator concentrations and conversion on the polymer structure. The broken line in each of the following Tables will indicate where significant levels of branch-upon-branch polymers are produced.

Part I was charged into the reactor equipped with stirrer, reflux condenser, thermocouple, and nitrogen positive pressure, and heated to 70° C. Part II and III were fed concurrently into the reactor over 150 and 120 minutes, respectively. After completing the addition of Part II, the reactor contents were held at 80° C. for an additional 60 minutes. The copolymerization kinetics have been followed by gas chromatography, NMR and GPC. ~5 g samples of the reaction mixture were withdrawn at 20 min. intervals followed by GC determination of the BA and vinylidene MMA-trimer concentrations. Volatiles were stripped on high vacuum for several hours and the oligomers/polymers were analyzed by NMR and GPC. Decane was used as an internal standard and molar response factors were determined using mixtures of known composition containing SCT MMA-trimer, BA and decane. The kinetic data are shown in Table 1. Polymer composition was followed by Matrix Assisted Laser Desorption Ionization (MALDI) Mass Spectroscopy. Polymer molecular weight was measured by SEC and viscometry. Structure of both polymers, including branching density and end groups, was characterized by $^1$H and $^{13}$C NMR.

TABLE 1

| Time (min) | CTA$^d$ conv. (%) | Polymer Composition (mole %) | | | No. of Br. Per Mol.$^{b)}$ | Polymer | | | | $\eta^{d)}$ | |
|---|---|---|---|---|---|---|---|---|---|---|---|
| | | (MMA)$_3$ | MMA | = BA | | $M_n{}^{a)}$ | $M_n{}^{c)}$ | $M_n{}^{d)}$ | PD$^{d)}$ | $M_n{}^{e)}$ | (dL/g) |
| 23 | 24.8 | 39.3 | 18.7 | 42.0 | 2.1 | 1200 | 1100 | | | | |
| 43 | 25.1 | 39.3 | 18.0 | 42.8 | 2.2 | 1300 | 1600 | | | | |
| 63 | 36.4 | 19.9 | 11.4 | 68.7 | 1.7 | 1600 | 2100 | | | | |
| 83 | 48.4 | 10.7 | 7.8 | 81.5 | 1.4 | 2100 | 2600 | | | | |
| 103 | 63.4 | 8.2 | 6.1 | 85.7 | 1.4 | 2500 | 3100 | 2400 | 2.4 | | 0.055 |
| 120 | 75.5 | 7.3 | 3.8 | 88.9 | 1.9 | 3900 | 4300 | 3800 | 3.2 | | 0.061 |
| 140 | 83.7 | 6.0 | 2.8 | 91.2 | 2.2 | 5200 | 6600 | 4400 | 3.6 | | 0.070 |
| 181 | 93.8 | 5.7 | 1.4 | 92.9 | 4.0 | 9900 | 12200 | 7100 | 5.0 | | 0.098 |
| 466 | 98.8 | 5.5 | 0.36 | 94.2 | 15.1 | | 27000 | 25000 | 4.3 | | 0.159 |

$^{a)}$(MMA)$^3$ = conversion by NMR
$^{b)}$No of Branches Per Molecule = (MMA)$^3$ in polymer/MMA = vinylidene ends in polymer
$^{c)}$by SEC vs. PMMA standards
$^{d)}$by SEC using universal calibration and viscometer
$^{e)}$by SEC using light scattering detector The polymers of this invention with the most desirable properties are those having at least 10%, more preferably at least 25%, and most preferably above 50%, branch upon branch architecture.

Example 1

Polymerization of Butyl Acrylate with Vinylidene Methyl Methacrylate-Trimer as a Chain Transfer Agent and Macromonomer at 70° C.

| Part | Ingredient | Amount |
|---|---|---|
| I | Toluene | 8 g |
| | Decane | 1 g |
| | (MMA)$_3$= | 7.5 g |
| II | Toluene | 25 g |
| | 2,2'-azobis(2-methylbutanenitrile) | 1 g |
| III | Butyl acrylate | 32 g |

Example 2

Polymerization of Butyl Acrylate with Vinylidene Methyl Methacrylate-Trimer as a Chain Transfer Agent and Macromonomer at 70° C.

| Part | Ingredient | Amount |
|---|---|---|
| I | Toluene | 8 g |
| | Decane | 1 g |
| | (MMA)$_3$= | 7.5 g |
| II | Toluene | 25 g |
| | 2,2'-azobis(2-methylbutanenitrile) | 3 g |
| III | Butyl acrylate | 32 g |

The procedure described in EXAMPLE 1 was followed except for the initiator concentration which was three times higher than that used in EXAMPLE 1.

TABLE 2

| Time (min) | CTA[d] conv. (%) | Polymer Composition (mole %) | | | No. of Br. Per Mol.[b] | Polymer $M_n$[a] | $M_n$[c] | $M_n$[d] | PD[d] | $\eta$[d] $M_n$[e] | (dL/g) |
|---|---|---|---|---|---|---|---|---|---|---|---|
| | | (MMA)₃ | MMA | = BA | | | | | | | |
| 20 | 31.0 | 56.0 | 23.5 | 20.5 | 2.4 | 410 | 1200 | | | | |
| 40 | 36.6 | 49.5 | 9.9 | 40.5 | 5.0 | 2300 | 2100 | | | | |
| 60 | 46.8 | 24.5 | 13.0 | 62.5 | 1.9 | 1500 | 1800 | | | | |
| 80 | 62.8 | 14.5 | 8.0 | 77.6 | 1.8 | 2100 | 2600 | | | | |
| 100 | 88.1 | 12.0 | 2.7 | 85.3 | 4.5 | 5700 | 4200 | | | | |
| 123 | 96.7 | 6.6 | 1.0 | 92.4 | 6.7 | 14400 | 11500 | | | | |
| 143 | 99.1 | 5.2 | 0.36 | 94.4 | 14.5 | | 25100 | | | | |
| 173 | 99.6 | 4.8 | 0.21 | 95.0 | 22.9 | | 30200 | | | | |
| 360 | 99.8 | 4.9 | 0.16 | 94.9 | 30.6 | | 29400 | | | | |

[a] (MMA)₃ = conversion by NMR
[b] No of Branches Per Molecule = (MMA)₃ in polymer/MMA = vinylidene ends in polymer
[c] by SEC vs PMMA standards
[d] by SEC using universal calibration and viscometer
[e] by SEC using light scattering detector

Example 3
Polymerization of Butyl Acrylate with Vinylidene Methyl Methacrylate-Trimer as a Chain Transfer Agent and Macromonomer at 80° C.

| Part | Ingredient | Amount |
|---|---|---|
| I | Toluene | 8 g |
| | Decane | 1 g |
| | (MMA)₃= | 7.5 g |
| II | Toluene | 25 g |
| | 2,2'-azobis(2-methylbutanenitrile) | 1 g |
| III | Butyl acrylate | 32 g |

The procedure described in EXAMPLE 1 was followed at 80° C. Kinetic re shown in Table 3.

Example 4
Polymerization of Butyl Acrylate with Vinylidene Methyl Methacrylate-Trimer as a Chain Transfer Agent and Macromonomer at 90° C.

| Part | Ingredient | Amount |
|---|---|---|
| I | Toluene | 8 g |
| | Decane | 1 g |
| | (MMA)₃= | 7.5 g |
| II | Toluene | 25 g |
| | 2,2'-azobis(2-methylbutanenitrile) | 1 g |
| III | Butyl acrylate | 32 g |

The procedure described in EXAMPLE 1 was followed at 90° C. Kinetic re shown in Table 4.

TABLE 3

| Time (min) | CTA[a] conv. (%) | Polymer Composition (mole %) | | | No. of Br. Per Mol.[b] | Polymer $M_n$[a] | $M_n$[c] | $M_n$[d] | PD[d] | $\eta$[d] $M_n$[e] | (dL/g) |
|---|---|---|---|---|---|---|---|---|---|---|---|
| | | (MMA)₃ | MMA | = BA | | | | | | | |
| 20 | 13.3 | 48.2 | 26.0 | 25.8 | 1.9 | 980 | 1600 | | | | |
| 40 | 14.3 | 70.3 | 16.6 | 13.1 | 4.3 | 1700 | 1600 | | | | |
| 60 | 24.6 | 45.5 | 9.9 | 44.6 | 4.6 | 2300 | 1600 | | | | |
| 80 | 43.1 | 11.5 | 7.4 | 81.2 | 1.6 | 2200 | 2400 | 2100 | 1.3 | | 0.028 |
| 100 | 83.9 | 6.7 | 3.5 | 89.8 | 1.9 | 4100 | 4100 | 3400 | 1.4 | | 0.043 |
| 120 | 93.7 | 5.8 | 1.6 | 92.6 | 3.6 | 9000 | 9800 | 5500 | 1.9 | | 0.058 |
| 140 | 98.2 | 5.7 | 0.74 | 93.5 | 7.7 | 18900 | 15000 | 5100 | 3.3 | | 0.067 |
| 180 | 99.0 | 5.7 | 0.46 | 93.9 | 12.3 | | 16600 | 5600 | 4.1 | | 0.087 |
| 430 | 99.7 | 5.6 | 0.17 | 94.2 | 33.2 | | 16100 | 6100 | 3.9 | | 0.090 |

[a] (MMA)₃ = conversion by NMR
[b] No of Branches Per Molecule = (MMA)₃ in polymer/MMA = vinylidene ends in polymer
[c] by SEC vs. PMMA standards
[d] by SEC using universal calibration and viscometer
[e] by SEC using light scattering detector

TABLE 4

| Time (min) | CTA[d] conv. (%) | Polymer Composition (mole %) | | | No. of Br. Per Mol.[b] | Polymer | | | | $\eta^{d)}$ | |
|---|---|---|---|---|---|---|---|---|---|---|---|
| | | $(MMA)_3$ | MMA | = BA | | $M_n{}^{a)}$ | $M_n{}^{c)}$ | $M_n{}^{d)}$ | $PD^{d)}$ | $M_n{}^{e)}$ | (dL/g) |
| 20 | 10.3 | 36.3 | 33.8 | 30.0 | 1.1 | 740 | 1100 | | | | |
| 40 | 30.7 | 12.0 | 25.7 | 62.4 | 0.5 | 750 | 1900 | | | | |
| 60 | 60.3 | 12.2 | 13.6 | 74.2 | 0.9 | 1300 | 2000 | | | | |
| 80 | 88.2 | 10.6 | 5.9 | 83.5 | 1.8 | 2700 | 3600 | | | | |
| 100 | 99.0 | 7.4 | 0.87 | 91.7 | 8.5 | 16400 | 16700 | 3,400 | 2.4 | | 0.040 |
| 120 | 100 | 5.1 | 0.14 | 94.8 | 36.3 | | 35500 | 9800 | 4.0 | 11000 | 0.132 |
| 145 | 100 | 3.2 | 0.12 | 96.7 | 26.3 | | 25700 | 35500 | 4.0 | 22000 | 0.221 |
| 340 | 100 | 3.0 | 0.10 | 96.9 | 29.9 | | 338000 | | | | |

[a]$(MMA)_3$ = conversion by NMR
[b]No of Branches Per Molecule $(MMA)_3$ in polymer/MMA = vinylidene ends in polymer
[c]by SEC vs. PMMA standards
[d]by SEC using universal calibration and viscometer
[e]by SEC using light scattering detector

Example 5

Polymerization of Butyl Acrylate with Vinylidene Methyl Methacrylate-Trimer as a Chain Transfer Agent and Macromonomer at 100° C.

| Part | Ingredient | Amount |
|---|---|---|
| I | Toluene | 8 g |
| | Decane | 1 g |
| | $(MMA)_3=$ | 7.5 g |
| II | Toluene | 25 g |
| | 2,2'-azobis(2-methylbutanenitrile) | 1 g |
| III | Butyl acrylate | 32 g |

The procedure described in EXAMPLE 1 was followed at 100° C. Kinetic are shown in Table 5.

TABLE 5

| Time (min) | CTA[a] conv. (%) | Polymer Composition (mole %) | | | No. of Br. Per Mol.[b] | Polymer | | | | $\eta^{d)}$ | |
|---|---|---|---|---|---|---|---|---|---|---|---|
| | | $(MMA)_3$ | MMA | = BA | | $M_n{}^{a)}$ | $M_n{}^{c)}$ | $M_n{}^{d)}$ | $PD^{d)}$ | $M_n{}^{e)}$ | (dL/g) |
| 20 | 21.7 | 16.4 | 28.1 | 55.6 | 0.6 | 730 | 1200 | | | | |
| 40 | 57.4 | 15.1 | 14.0 | 70.9 | 0.9 | 1200 | 1500 | | | | |
| 60 | 85.7 | 11.0 | 7.2 | 81.8 | 1.5 | 2200 | 2600 | | | | |
| 80 | 97.5 | 9.6 | 2.1 | 88.3 | 4.5 | 6900 | 4100 | | | | |
| 100 | 99.5 | 7.2 | 0.46 | 92.3 | 15.7 | 31000 | 13200 | 10500 | 4.3 | | 0.078 |
| 120 | 99.8 | 5.5 | 0.20 | 94.3 | 27.6 | | 15400 | 16300 | 3.7 | | 0.125 |
| 142 | 99.6 | 5.0 | 0.15 | 94.9 | 33.0 | | 15500 | 15400 | 3.7 | | 0.118 |
| 175 | 99.0 | 5.0 | 0.16 | 94.9 | 31.0 | | 13700 | 12300 | 4.2 | | 0.114 |
| 310 | 99.4 | 5.0 | 0.11 | 94.9 | 45.0 | | 20400 | | | | |

[a]$(MMA)_3$ = conversion by NMR
[b]No of branches Per Molecule = $(MMA)_3$ in polymer/MMA = vinylidene ends in polymer
[c]by SEC vs. PMMA standards
[d]by SEC using universal calibration and viscometer
[e]by SEC using light scattering detector Examples 6–10

TABLE 6

Effect of Temperature and the Ratio of Butyl Acrylate/Vinylidene Methyl Methacrylate Trimer on Number of Branches Per Macromolecule.

| EXAMPLE | Temp (° C.) | $(MMA)_3$ = (mole %) $^1$H NMR | $^{13}$C NMR | Number of Branches Per Molecule $^1$H NMR | $^{13}$C NMR EG[b] | QC[c] | $M_n$ $^1$H NMR | $^{13}$C NMR | SEC[a] |
|---|---|---|---|---|---|---|---|---|---|
| Control | 80 | 15.0 | 14.7 | 2.2 | 2.2 | — | 2,800 | 2,400 | 2,300 |
| 6 | 80 | 9.6 | 9.6 | 6.6 | 5.7 | 5.0 | 11,500 | 10,000 | 9,100 |
| Control | 80 | 18.3 | 17.5 | 1.9 | 1.8 | 1.8 | 2,500 | 2,400 | 3,200 |
| 7 | 80 | 9.1 | 8.8 | 7.7 | 6.7 | 7.2 | 13,700 | 12,200 | 10,700 |
| 8 | 100 | 8.7 | 8.1 | 11.5 | 6.4 | 9.8 | 20,600 | 12,200 | 8,200 |
| 9 | 60 | 9.7 | 8.9 | 5.9 | 5.5 | 5.9 | 10,300 | 9,800 | 11,900 |
| 10 | 60 | 7.1 | 10.1 | 6.1 | — | — | 10,800 | — | 9,200 |

[a] by SEC in THF, $M_n$ vs. PMMA × 128/100 [M(BA)/M(MMA)]
[b] EG - from end group analysis, the ratio of [⅓ of the total methyl ester carbons minus (the average of the 2 vinyl carbons and the unsaturated carbonyl carbon from the b-scission end group)] to [the average of the 2 vinyl carbons and the unsaturated carbonyl carbon from the b-scission end group]
[c] QC - from quarternary carbon analysis, the ratio of [the integral of the quarternary carbon of the branch] to [the average of the 2 vinyl carbons and the unsaturated carbonyl carbon from the b-scission end group]

Examples 11–15

TABLE 7

Effect of Temperature and the Ratio of Butyl Acrylate/Vinylidene Methyl Methacrylate Trimer on Number of Branches Per Macromolecule.

| Experiment (temp.) | $(MMA)_3$ = (mole %) $^1$H NMR | $^{13}$C NMR | Number of Branches Per Molecule $^1$H NMR | $^{13}$C NMR | $M_n$ $^1$H NMR | $^{13}$C NMR | SEC[a] |
|---|---|---|---|---|---|---|---|
| 11 (80° C.) | 7.5 | 7.4 | 17 | — | 33,600 | — | 20,200 |
| Control (80° C.) | 14.8 | 14.4 | 3.7 | 3.5 | 4,900 | 4,800 | 3700 |
| 12 (80° C.) | 8.2 | 7.6 | 23 | — | 41,700 | — | 28,200 |
| 13 (100° C.) | 7.3 | 7.2 | 27 | — | — | — | 21,600 |
| 14 (60° C.) | 8.2 | 7.1 | 13 | — | 25,000 | — | 27,600 |
| 15 (60° C.) | 7.5 | 7.9 | 56 | — | 107,000 | — | 64,100 |

[a] from universal calibration

Example 16

Demonstration of Branched Structure of Poly(butyl acrylates) Prepared Using Methyl Methacrylate Vinylidene Trimer $(MMA)_3$= as Chain Transfer Agent and Macromonomer Linear poly(butyl acrylates) have an "a" coefficient of 0.70 in the Mark-Houwink equation, $[\eta]=K\ M^a$. Copolymers 3 in contrast have an "a" Mark-Houwink coefficient of 0.35–0.50, as would be expected for a polymer having a branched rather than a linear structure.

What is claimed is:

1. An improved process for the free-radical polymerization of at least one unsaturated vinylic monomer to form a polymer whose molecular architecture includes at least 10% having branches upon branches and a polymerizable vinyl-terminated end group, comprising contacting
   (i) one or more vinylic monomers having the formula $CH_2$=CYZ, and
   (ii) a chain transfer agent of formula $CH_2$=CQ($CH_2$—X), wherein:
   Y is selected from the group consisting of OR, $O_2CR$, halogen, $CO_2H$, COR, $CO_2R$, CN, $CONH_2$, CONHR, $CONR_2$ and R';
   Z is selected H, $CH_3$, or $CH_2OH$ provided at least 85.3 mole percent of the (i) has Z=H;
   R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen, and the number of carbons in said alkyl groups is from 1 to 12; and
   R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;
   X is selected from —(CUY—$CH_2$)$_n$—Z', S(O)R, S(O)$_2$R, $SnR_3$, halogen, $R^2$ and $R^3$;

U is selected from H and R;

Q is selected from Y, or in the case where X is halogen, Y and H;

Z' is selected from H, $SR^1$, $S(O)R$, $S(O)_2R$, $R^2$ and $R^3$;

n is $\geq 1$;

R is selected from the group substituted and unsubstituted alkyl, aryl, aralkyl, alkaryl and organosilicon groups wherein the substituent(s) are independently from the group carboxyl, epoxy, hydroxyl, alkoxy, amino and halogen;

$R^1$ is selected from the group H, substituted and unsubstituted alkyl, aryl, aralkyl, alkaryl and organosilicon groups wherein the substituent(s) are independently from the group carboxyl, epoxy, hydroxyl, alkoxy, amino and halogen;

$R^2$ is selected from the group free radical initiator-derived fragments of substituted and unsubstituted alkyl, cycloalkyl, aryl, aralkyl, alkaryl, organosilyl, alkoxyalkyl, alkoxyaryl, sulfate groups wherein the substituent(s) are independently selected from R, $OR^1$, $O_2CR$, halogen, $CO_2H$ and salts thereof, $CO_2R$, CN, $CONH_2$, $CO_2NHR$, $CONR_2$;

$R^3$ is selected from the group free radical initiator-derived fragments of substituted and unsubstituted alkyl, cycloalkyl, aryl, aralkyl, alkaryl, organosilyl, alkoxyalkyl, alkoxyaryl, and $P(O)R_2$ groups wherein the substituent(s) are independently selected from R, $OR^1$, $O_2CR$, halogen, $CO_2H$ and salts thereof, $CO_2R$, CN, $CONH_2$, $CO_2NHR$, $CONR_2$;

wherein the improvement comprises obtaining higher yields of polymer having the branch-upon-branch architecture and polymerizable vinylic chain termini, and a higher density of branches upon branches in that polymer by optimizing the polymerization in the following way: select step III and at least one of I; II; I and IV; and II and IV from steps:

I—decreasing reactivity ratios of (i) and the resulting vinylic-terminated macromonomers and polymers toward 0;

II—selecting the ratio of(i)/(ii) between 7.11 and 100, dependent on t he values of I, III and IV;

III—increasing the conversion of (i) and (ii) from 80% toward 100%;

IV—increasing the temperature from 50° C. toward 150° C.

2. A process according to claim 1 wherein Z=H.

3. A process according to claim 1 wherein X=—(CUY—$CH_2)_n$—Z'.

4. A process according to claim 1 wherein, in (i), Z=H and, in (ii), X=—(CUY—$CH_2)_n$—Z'.

5. A process according to claim 1 wherein Z' is substituted alkyl, aryl, aralkyl, alkaryl, organosilyl wherein the reactive substituent(s) are independently selected from the group carboxylic acid, carboxylic ester, epoxy, hydroxyl, alkoxy, amino and halogen.

6. A process according to claim 3 wherein:

Z is H;

Q is $CO_2R$; and the molar ratio if (i)/(ii) is 5 to 30; and conversion of each of (i) and (ii) is 85 to 100%.

7. A composition of matter comprising a polymer having a branch-upon-branch structure and a polymerizable olefinic end group, having the structure:

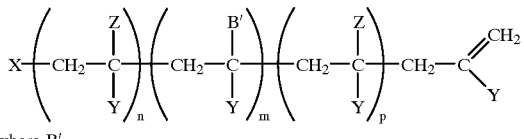

where B' =

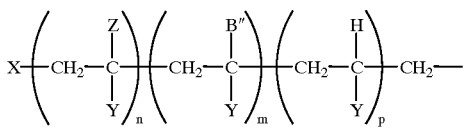

B"=X, B', H, $CH_3$, $CH_2CHR^1CH_3$, or $CH_2CMeR^2CH_3$,

X is selected from —(CUY—$CH_2)_n$—Z', $S(O)R$, $S(O)_2R$, $SnR_3$, halogen, $R^2$ and $R^3$, where Z' is selected from H, $SR^1$, $S(O)R$, $S(O)_2R$, $R^2$ and $R^3$;

Y is selected from the group consisting of OR, $O_2CR$, halogen, $CO_2H$, COR, $CO_2R$, CN, $CONH_2$, CONHR, $CONR_2$ and R', Z is selected H, $CH_3$ or $CH_2OH$;

where:

R' is selected from the aromatic group consisting of substituted and unsubstituted aryl, substituted and unsubstituted heteroaryl, the substituents being the same or different and selected from the group consisting of carboxyl acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;

$R^1$ is selected from the group H, substituted and unsubstituted alkyl, aryl, aralkyl, alkaryl and organosilicon groups wherein the substituent(s) are independently from the group carboxyl, epoxy, hydroxyl, alkoxy, amino and halogen;

$R^2$ is selected from the group free radical initiator-derived fragments of substituted and unsubstituted alkyl, cycloalkyl, aryl, aralkyl, alkaryl, organosilyl, alkoxyalkyl, alkoxyaryl, sulfate groups wherein the substituent(s) are independently selected from R, $OR^1$, $O_2CR$, halogen, $CO_2H$ and salts thereof, $CO_2R$, CN, $CONH_2$, $CO_2NHR$, $CONR_2$;

$R^3$ is selected from the group free radical initiator-derived fragments of substituted and unsubstituted alkyl, cycloalkyl, aryl, aralkyl, alkaryl, organosilyl, alkoxyalkyl, alkoxyaryl, and $P(O)R_2$ groups wherein the substituent(s) are independently selected from R, $OR^1$, $O_2CR$, halogen, $CO_2H$ and salt thereof, $CO_2R$, CN, $CONH_2$, $CO_2NHR$, $CONR_2$;

n=1–20, m=0–5, p=0–20; n+m+p$\geq$2;

and if m>1, then the m insertions are not consecutive.

8. The composition according to claim 7 wherein X is —(CUY—$CH_2)_n$—Z' where U is selected from H and R.

* * * * *

UNITED STATES PATENT AND TRADEMARK OFFICE
CERTIFICATE OF CORRECTION

PATENT NO.    : 6,100,350
DATED         : August 8, 2000
INVENTOR(S)   : Lech Wilczek and Elizabeth Forrester McCord It is certified that error appears in the above-identified patent and that said Letters Patent is hereby corrected as shown below:

Title page,
*Assistant Examiner*, line 25, "Caixia Lu" should be -- Caixia Lu-Rutt --.

Column 17,
Line 43, "t he" should be -- the --.
Line 52, "is substituted" should be -- is a substituted --.

Column 18,
Line 1, "having a" should be -- having at least 10% of a --.
Line 3, "salt" should be -- salts --.
Line 13, second formula, remove the "X" at the beginning of the formula.
Line 24, after "CH2OH insert -- provided at least 85.3 mole percent of the structure has Z = H --.

Signed and Sealed this

Sixteenth Day of April, 2002

*Attest:*

JAMES E. ROGAN
*Director of the United States Patent and Trademark Office*

*Attesting Officer*